United States Patent [19]

Hansman, Jr.

[11] 4,365,131
[45] Dec. 21, 1982

[54] MICROWAVE ICE PREVENTION SYSTEM

[76] Inventor: Robert J. Hansman, Jr., 1 Common La., Scituate, Mass. 02066

[21] Appl. No.: 163,520

[22] Filed: Jun. 27, 1980

[51] Int. Cl.³ .............................................. H05B 6/64
[52] U.S. Cl. ...................... 219/10.55 M; 324/58.5 A; 340/581; 244/134 D
[58] Field of Search ............... 219/10.55 B, 10.55 R, 219/10.55 M, 10.55 F, 202, 203; 324/58.5 R, 58.5 A; 340/580, 581; 244/134 R, 134 D, 134 F

[56] References Cited
PUBLICATIONS

USAAMRDL-76-18, "Feasibility Analysis for Microwave Deicer for Helicopter Blades", Magenheim et al., 5-1977.

Primary Examiner—M. H. Paschall

[57] ABSTRACT

A system which prevents the formation of ice on the external surfaces of aircraft structures by heating impinging atmospheric supercooled water droplets to above the freezing point by the transmission of microwave electromagnetic energy to the droplets which if unheated would freeze upon impact and adhere to the aircraft structures. The frequency of the microwave electromagnetic energy is such that it is strongly absorbed by the liquid water droplets but weakly absorbed by ambient air, frozen water or the aircraft structures, thus resulting in very efficient heating of the supercooled water droplets.

3 Claims, 5 Drawing Figures 4,365,131

MICROWAVE ICE PREVENTION SYSTEM

BACKGROUND OF THE INVENTION

The present invention relates generally to ice prevention systems for aircraft structures. The problems relating to the formation of ice on aircraft structures are well known. In certain climatic conditions water droplets may exist at subfreezing temperatures in a liquid state. These supercooled droplets nucleate and form ice upon contact with the aircraft surfaces. Ice therefore tends to form on the leading edges of aircraft structures. The ice can degrade aircraft performance through increasing the effective weight of the aircraft and by increasing drag resistance and reducing lift provided by the airfoils. In the case of propeller and rotor icing, asymmetries in the ice build-up can cause serious vibrations resulting in structural damage.

Various techniques have been employed in the past in an attempt to avoid the problems caused by icing. These include deicing devices which remove the ice by scraping or cracking, or which melt the ice with microwave heating. One problem with such prior art deicing devices is that the ice is removed in large pieces which then become projectiles threatening to the aircraft. Another problem is that propellers and rotors can deice asymmetrically causing the difficulties described above. Other prior art devices employ electrical heating elements within the structure as deicing or anti-icing devices. Electrothermal devices are by nature inefficient for two reasons. first they melt ice which requires substantially more energy than simply heating the ice to above freezing due to the latent heat of fusion required to melt ice of 334 joules/gm. Microwave deicing devices are also susceptible to this inefficiency. Second, electrothermal devices heat large areas of the airfoil which are then cooled as conduction carries off heat to both the cooler parts of the structure and to the environment with only a small fraction of the energy actually melting ice. These inefficiencies are a major problem in aircraft systems where the total available power is, in general, quite limited.

It will be apparent from the foregoing that there is a clear need for an ice prevention technique which avoids or minimizes the disadvantages of the prior art. The present invention fulfills this need.

It will also be apparent from the following that although the present invention is described in terms of aircraft structures, it will work equally well on any surface in any environment where icing is a problem.

SUMMARY OF THE INVENTION

The present invention consists of an ice prevention apparatus, especially for aircraft structures, and a method for its use in which microwave electromagnetic energy is transmitted into a heating region just upstream of the structural member to be protected from icing. Incident supercooled water droplets pass though this region of microwave energy and are heated. This process is extremely efficient in that the water droplets are heated preferentially over the other environmental constituents such as air, ice snow, other frozen precipitation, as well as the structure itself. This preferential heating is due to the resonant absorbtion of electromagnetic energy on the microwave spectrum by water. The process is also efficient because ice never forms on the structure and need not be melted, so that no energy is lost as latent heat of fusion.

Basically, and in general terms, the apparatus of the invention includes a means for generating microwave electromagnetic energy, transmission means for distributing the microwave energy in the heating region in such a manner that all incident supercooled water drolets are heated to above the freezing point before impacting the structure thus preventing ice formation. The method of this invention includes the steps of generating microwave electromagnetic energy, transmitting the energy to the heating region upstream of the structure and distributing the energy in such a way that any incident supercooled water droplets are heated by absorbtion of microwave energy sufficiently to prevent ice formation on the structure.

It will be appreciated from the foregoing that the present invention represents a substantial advance in aircraft ice prevention techniques. In particular it provides an ice prevention device having lower power consumption, lower weight and lower cost than ice prevention devices available heretofore. Moreover, the ice prevention device of the present invention is more reliable and easier to maintain than devices of the prior art.

DESCRIPTION OF THE PREFERRED EMBODIMENTS

Figure 1:
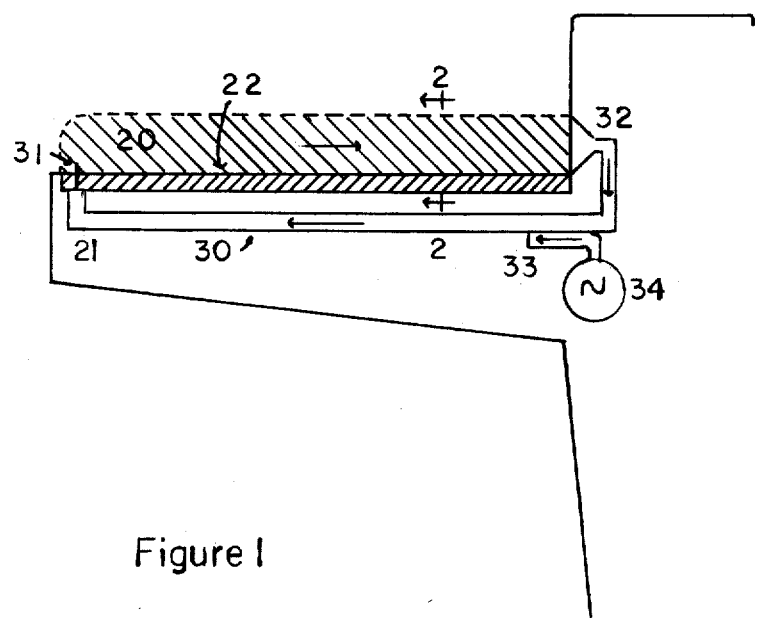
FIGS. 1, 1A and 1B are fragmentary plan views of an airplane equipped with the device showing the basic components of the microwave circuit.

As shown in the drawings for the purposes of illustration the present invention is principally concerned with a novel technique of ice prevention on the external surfaces of aircraft structures. The invention now to be described in detail is specifically designed to prevent the formation of ice on the leading edge of aircraft wings using a surface waveguide to distribute the microwave electromagnetic energy in the heating region. It should be obvious from the following that propeller blades, rotor blades, tail surfaces, engine inlets, antennae and the like could be similarly equipped and that microwave horns 32 or antennae 35 could be used to distribute the microwave energy in the heating region.

In accordance with the present invention microwave electromagnetic energy is transmitted through the heating region, indicated by reference numeral 20, just ahead of the leading edge of the wing 21. The microwave energy in the heating region 20 is in the form of a loosely bound TM wave which is attached to the leading edge of the wing 21 by a surface waveguide dielectric coating 22. The propogation of electromagnetic waves in a surface waveguide can be conveniently defined in terms of wave solutions to Maxwell's equations but these detailed theoretical considerations are not believed to be necessary to an understanding of the invention. The theory of surface waveguides is elaborated on in a number of reference works including: R. Collin, *Field Theory of Guided Waves*, McGraw-Hill, New York (1960).

Figure 1A:
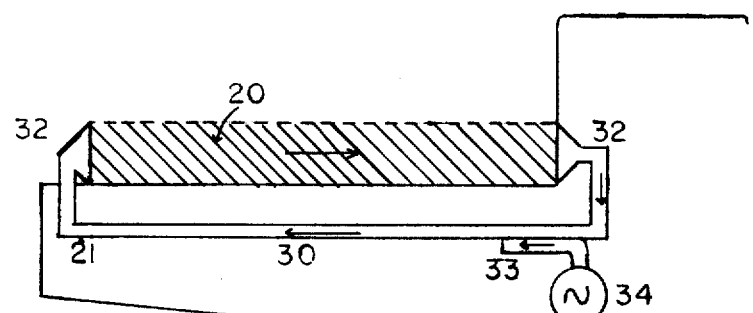
Figure 1B:
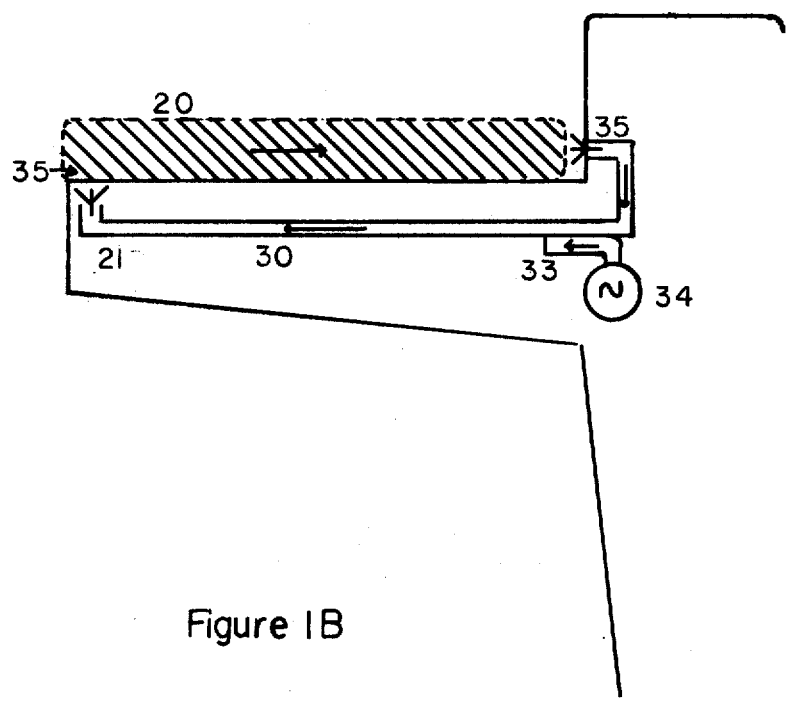
Figure 2:
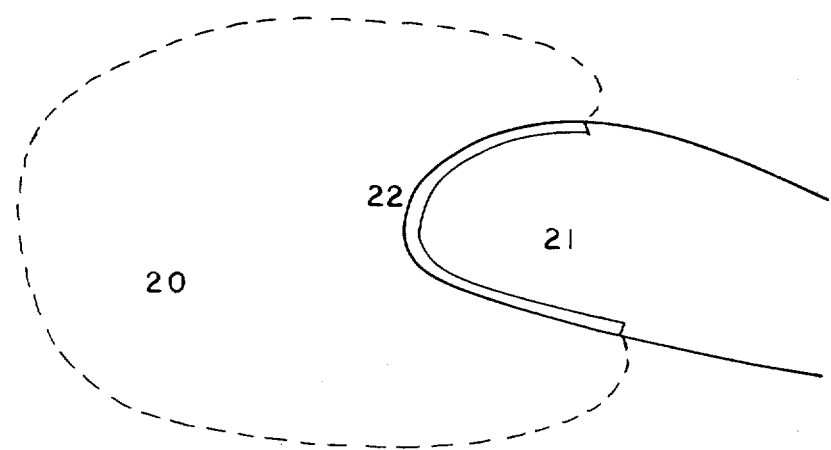
FIG. 2 is a fragmentary sectional view of the line 2—2 of FIG. 1.

The distribution of the microwave electromagnetic energy in the heating region 20 is designed to provide ample heating time for the transient supercooled water drolets to be heated to above the freezing point before impacting the particular airfoil and is controlled by the thickness of the dielectric coating 22. The flow of microwave elecromagnetic energy is shown in FIG. 1 where the arrows indicate the direction of power flow. The microwave energy flows in a closed loop. The loosely bound waves are launched into the heating region 20 by a surface waveguide launcher 31 located at the wingtip. Microwave energy flows inboard through the heating region 20 guided by the surface waveguide 22 and heats the water droplets in the region. Once the region has been transversed any remaining power is collected by a microwave horn 32 and recirculated to the wingtip surface waveguide launcher 31 through a conventional waveguide circuit 30. Power is supplied to the circuit by an oscillator 34 through a directional coupler 33. FIG. 1a and FIG. 1b depict analogous systems where the surface waveguide is replaced by microwave horns 30 or microwave antennae 35.

Figure 3:
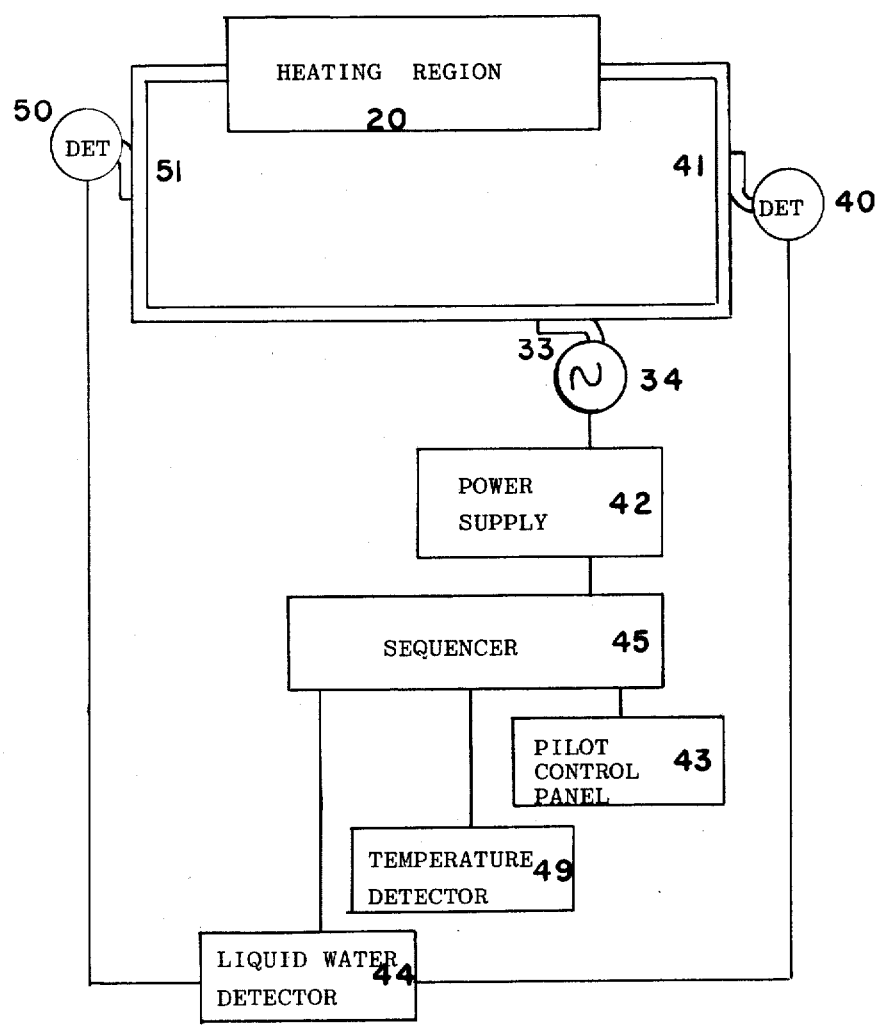
FIG. 3 is a simplified block diagram of the microwave circuit and the control system.

The control system and the microwave circuit are shown in FIG. 3. The microwave tube 34 is a conventional oscillator such as a magnetron or klystron type of tube and the power supply 42 is a conventional one of such a tube. The frequency of operation is a design parameter but will be between roughly 2,000 and 24,000 megahertz. The presence of incident liquid water droplets is inferred by a detector 46 which measures the power loss by microwaves transversing heating region. This measurement is made by comparing signals from a microwave power detector 50 coupled to the microwave circuit by a directional coupler 51 just before the heating and a similar detector 40 just after the heating region. The microwave signal is supplied by an oscillator 34 which is pulsed at a controlled rate by sequencer 45 which is controlled by pilot's control panel 43. If an icing threat exists based on the measurements of the air temperature detector 44 and the liquid water detector 46 and the system is armed by the pilots control panel 43 then the sequencer 45 will activate oscillator 34 continuously to maintain sufficient microwave power flow through the heating region to prevent icing.

It will be appreciated from the foregoing that the present invention represents a substantial advance in the field of ice prevention systems. In particular, the invention provides a method and a means for ice prevention by heating incident supercooled water droplets by the resonant absorbtion of microwave electromagnetic energy before impacting the structure to be protected. This method is very efficient due to the preferential heating of the water droplets and the fact that the droplets do not change phase from water to ice and back. It will also be appreciated that, although the invention has been described with reference to specific embodiments for ice prevention of aircraft wings the invention may be used on any structure where icing is a problem and that various modifications may be made without deviating from the spirit or scope of the invention. Accordingly the invention is not limited except by the appended claims.

I claim:

1. A method for the prevention of ice formation on exposed structures, comprising the steps of:
   generating microwave electromagnetic energy at a frequency such that said energy is strongly absorbed by liquid water and weakly absorbed by said structure or by frozen water;
   transmitting and distributing the microwave energy to a heating region in front of the structure to be protected; and
   heating any incident supercooled water droplets to above freezing by the absorption of microwave electromagnetic energy before impacting the structure and thus preventing icing.

2. A method as set forth in claim 1, and further including the step of collecting and recycling unabsorbed microwave electromagnetic energy.

3. A method as set forth in claim 2, and further including the step of detecting the presence of incident liquid water by intermittently transmitting said microwave energy into said heating region, measuring the absorbed microwave energy and switching the microwave ice prevention system on continuously upon detection of liquid water.

* * * * *